Figure 1:
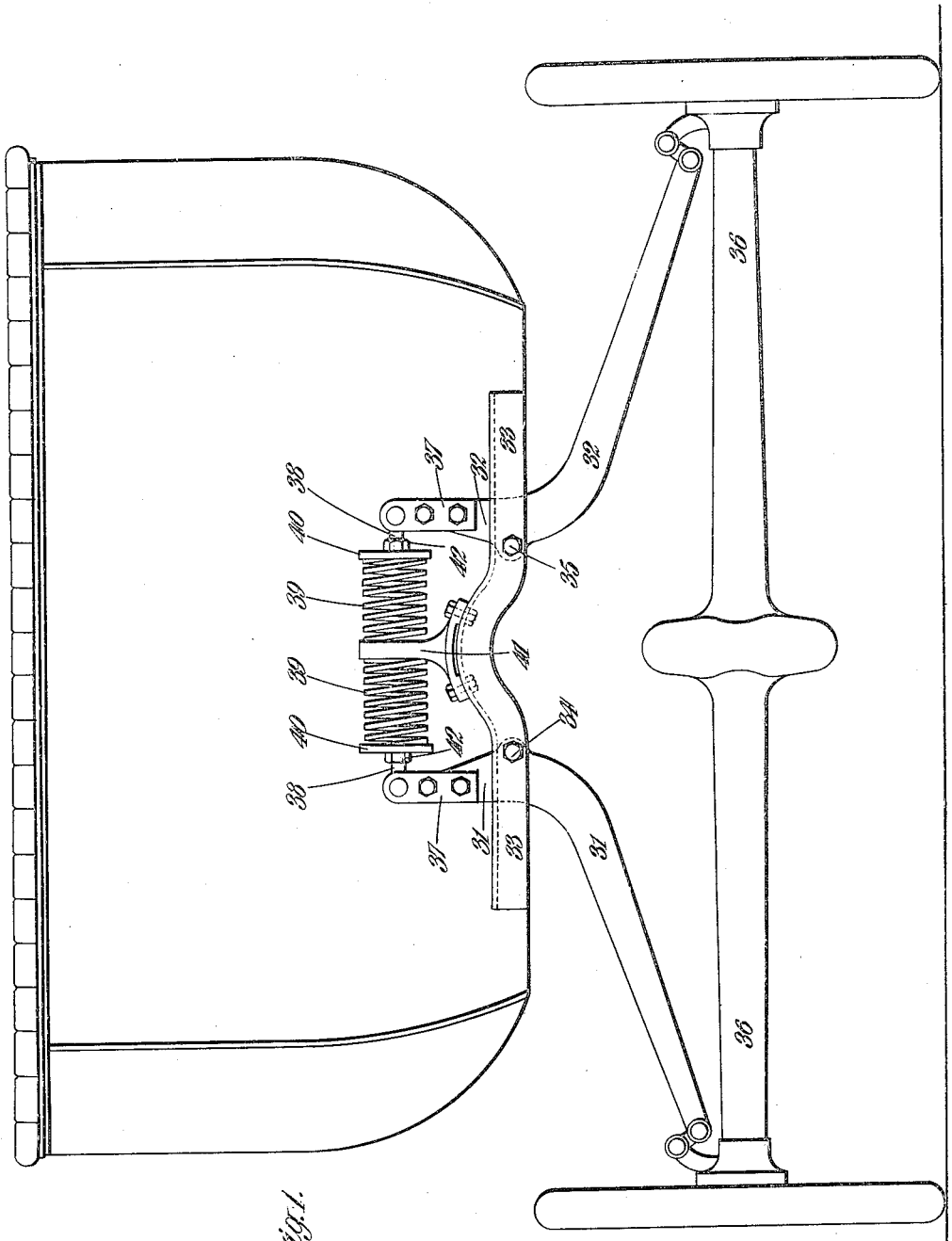

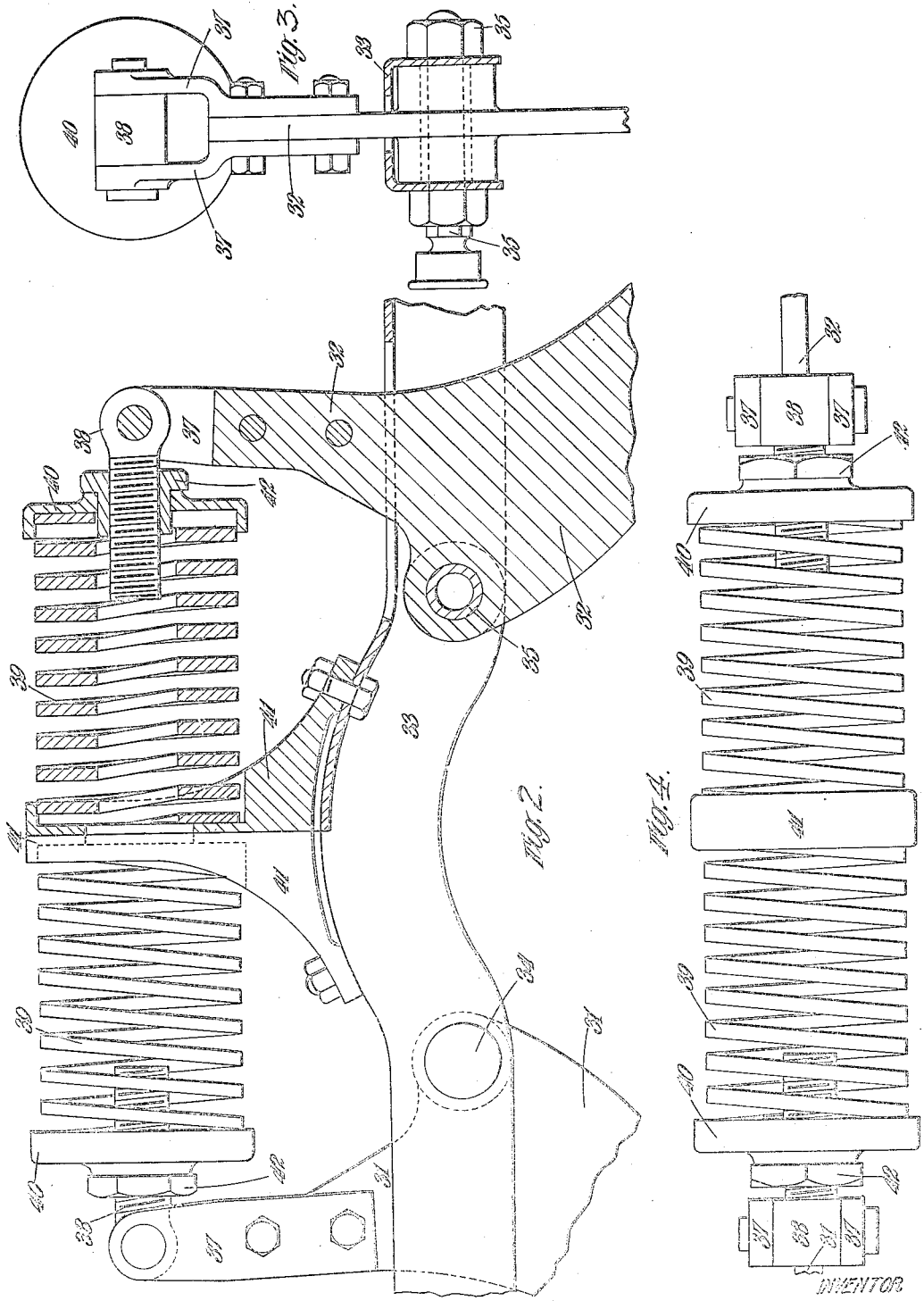

UNITED STATES PATENT OFFICE.

ARTHUR JOHN ADAMS, OF HEYWOOD, NEAR WESTBURY, ENGLAND.

SPRINGING OF VEHICLES.

1,214,254.  Specification of Letters Patent.  Patented Jan. 30, 1917.

Application filed April 5, 1916. Serial No. 89,055.

*To all whom it may concern:*

Be it known that I, ARTHUR JOHN ADAMS, a subject of the King of Great Britain, and resident of The Cottage, Heywood, near Westbury, Wilts, England, have invented certain new and useful Improvements in the Springing of Vehicles, of which the following is a specification.

This invention relates to the springing of vehicles of various sorts, of the kind wherein the vehicle frame is attached to the axle by means of levers, the ends of which act on horizontally arranged springs, and the invention has special reference to the springing of automobiles.

For simplification in description the invention is hereinafter set forth at length in its application to motor cars and like vehicles. As applied to other kinds of vehicles the invention is, in its essential features, the same as for automobiles, with such modifications in detail and in relation to attachments as the differences in application require.

Referring to the accompanying drawings, Figure 1 is a rear view of an automobile illustrating this invention. The arrangement is, with necessary variation in details of mounting, repeated in respect of a front axle. Fig. 2 is a rear view, partly sectional, of the springing. Fig. 3 is an end view. Fig. 4 is a plan of the spring shown in Fig. 2.

The arrangement is described as applied to a rear axle, but it is to be understood that the arrangement is, with necessary variation in details, substantially the same in its application to front axles. The levers 31 and 32 are pivotally hung to the vehicle frame 33 at 34 and 35 respectively. At their lower ends the levers are connected to links attached to the axle casing 36. At their upper ends the levers are pivotally connected by lugs 37 to eyebolts 38 which are screw-threaded and extend into the springs 39. The springs which are single in the example illustrated, but may be multiple, are capped by flanged thrust plates 40. A central bracket 41 bolted to or otherwise fixed on the frame 33, and flanged on both sides, intervenes between the springs 39. The eyebolts 38 carry adjusting nuts 42 on the bodies of which the end plates 40 are an easy fit. By the nuts working on the eyebolts 38 the springs 39 are adjustable as to tension or degree of stiffening. The central bracket resists side-sway or lateral rocking of the vehicle.

The relation in length of the longer arms of the levers 31 and 32 to the shorter arms thereof insures a slow rebound of the springs relatively to the extent of compression movement imparting to the springs by the load and by shocks in the running of the vehicle. Accordingly, the method of springing provides a ready yield of the springs in compression combined with slow rebound. It is obvious that the load being applied to the levers 31 and 32 at the ends of their longer arms, great compressive power is transmitted to the springs, consequently causing a ready deflection thereof, and, on the other hand, owing to the spring having to bring the load back to the normal position through the medium of the short arms of the levers acting on the long arms thereof, a rapid rebound is eliminated.

What I claim is:—

1. Improved means for springing a vehicle frame on an axle, comprising levers pivoted to said frame and to said axle, coiled springs adapted to bear against shorter arms of said levers, relatively longer arms of said levers being pivoted to links, said links being the usual shackles of the laminated springs which are replaced, and said coiled springs being placed horizontally above said frame and transversely of the vehicle.

2. Improved means for springing a vehicle frame on an axle, comprising levers pivoted to said frame and to said axle, coiled springs adapted to bear against shorter arms of said levers, relatively longer arms of said levers being pivoted to links, said links being the usual shackles of the laminated springs which are replaced, and said coiled springs being placed horizontally above said frame and transversely of the vehicle, a bracket secured to said frame and against which said springs bear, screw-threaded eye-bolts connected with said levers, and tension-controlling nuts on said screw-threaded eye-bolts, the longer arms of said levers being indirectly connected with the axle casing in respect of the rear axle and indirectly connected with the axle itself in respect of the front axle, substantially as set forth.

ARTHUR JOHN ADAMS.